(12) United States Patent
Bradley et al.

(10) Patent No.: US 11,528,604 B2
(45) Date of Patent: Dec. 13, 2022

(54) METHOD FOR TRANSMITTING TO A PHYSICAL OR VIRTUAL ELEMENT OF A TELECOMMUNICATIONS NETWORK AN ENCRYPTED SUBSCRIPTION IDENTIFIER STORED IN A SECURITY ELEMENT, CORRESPONDING SECURITY ELEMENT, PHYSICAL OR VIRTUAL ELEMENT AND TERMINAL COOPERATING WITH THIS SECURITY ELEMENT

(71) Applicant: THALES DIS FRANCE SAS, Meudon (FR)

(72) Inventors: Paul Bradley, Gemenos (FR); Mireille Pauliac, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 268 days.

(21) Appl. No.: 16/753,465

(22) PCT Filed: Oct. 2, 2018

(86) PCT No.: PCT/EP2018/076850
§ 371 (c)(1),
(2) Date: Apr. 3, 2020

(87) PCT Pub. No.: WO2019/068731
PCT Pub. Date: Apr. 11, 2019

(65) Prior Publication Data
US 2020/0260273 A1 Aug. 13, 2020

(30) Foreign Application Priority Data
Oct. 6, 2017 (EP) ...................................... 17306349

(51) Int. Cl.
*H04L 9/40* (2022.01)
*H04W 12/06* (2021.01)
(Continued)

(52) U.S. Cl.
CPC ........... *H04W 12/06* (2013.01); *H04L 9/3234* (2013.01); *H04L 63/0853* (2013.01); *H04W 4/40* (2018.02); *H04L 2209/80* (2013.01); *H04W 88/02* (2013.01)

(58) Field of Classification Search
CPC ............................ H04W 12/06; H04W 9/3234
(Continued)

(56) References Cited

U.S. PATENT DOCUMENTS

| 6,373,949 B1 | 4/2002 | Aura |
| 2003/0101345 A1 | 5/2003 | Nyberg |

(Continued)

FOREIGN PATENT DOCUMENTS

| EP | 3110189 A1 | 12/2016 |
| JP | 2006-500842 A | 1/2006 |

(Continued)

OTHER PUBLICATIONS

Office Action (Notice of Reasons for Rejection) dated May 18, 2021, in corresponding Japanese Patent Application No. 2020-519423 and English translation of the Office Action. (7 pages).

(Continued)

*Primary Examiner* — Anthony D Brown
(74) *Attorney, Agent, or Firm* — Marc Boillot—Thales Dis CPL USA, Inc

(57) ABSTRACT

The invention concerns a method for transmitting to a physical or virtual element of a telecommunications network, an encrypted subscription identifier stored in a security element, or an encrypted identifier of the security element or an encrypted identifier of a terminal cooperating with the security element. The method includes pre-calculating proactively, at the occurrence of an event, the encrypted identifier using a key and storing it in a file or memory of the security element with a parameter enabling (Continued)

Figure 1:
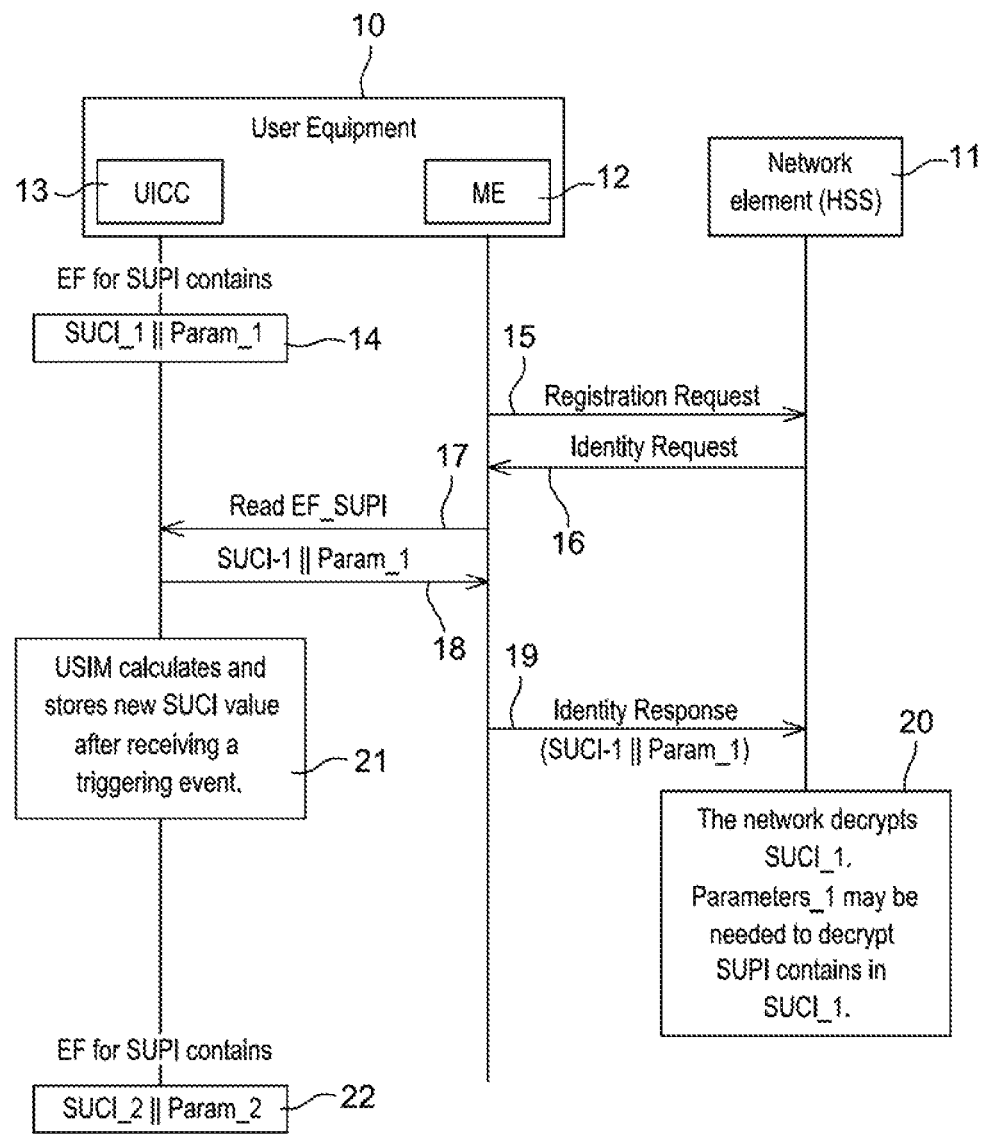

the key to be calculated by the element of the telecommunications network, in order to be able to transmit to the element of the telecommunications network the encrypted identifier and the parameter, without having to compute the encrypted identifier when the terminal is asking for it.

13 Claims, 2 Drawing Sheets

(51) Int. Cl.
  *H04W 4/40* (2018.01)
  *H04L 9/32* (2006.01)
  *H04W 88/02* (2009.01)
(58) Field of Classification Search
  USPC .......................................................... 713/168
  See application file for complete search history.

(56) References Cited

U.S. PATENT DOCUMENTS

| | | | |
|---|---|---|---|
| 2006/0141987 | A1 | 6/2006 | De Groot |
| 2007/0293192 | A9 | 12/2007 | De Groot |
| 2014/0143826 | A1 | 5/2014 | Sharp et al. |
| 2016/0112206 | A1* | 4/2016 | Cizas ................... H04L 9/3268 |
| | | | 713/158 |
| 2018/0324583 | A1* | 11/2018 | Nair .................... H04W 12/033 |

FOREIGN PATENT DOCUMENTS

| | | |
|---|---|---|
| WO | 2005032170 A2 | 4/2005 |
| WO | WO2017016889 A1 | 2/2017 |
| WO | 2017072647 A1 | 5/2017 |
| WO | WO2017152871 A1 | 9/2017 |

OTHER PUBLICATIONS

International Search Report (PCT/ISA/210) dated Nov. 13, 2018, by the European Patent Office as the International Searching Authority for International Application No. PCT/EP2018/076850.

Written Opinion (PCT/ISA/237) dated Nov. 13, 2020, by the European Patent Office as the International Searching Authority for International Application No. PCT/EP2018/076850.

English translation of Office Action mailed for co-pending Application in Japan N°2020-519423 dated Jan. 11, 2022 (18 pages).

China Mobile, Thales, pCR Security enhancement to the attach procedure without relying on PKI [online], 3GPP TSG SA WG3 #85 S3-161775, Internet<URL:http://www.3gpp.org/ftp/tsg_saWG3_Security/TGS3_85_85_Santa_Cruz/Docs/S3-161775.zip.

Office Action (Communication pursuant to Rule 94_3 EPC) for co-pending EP Application N°18783418.9, mailed by EPO dated Jan. 24, 2022 (6 pages).

* cited by examiner

METHOD FOR TRANSMITTING TO A PHYSICAL OR VIRTUAL ELEMENT OF A TELECOMMUNICATIONS NETWORK AN ENCRYPTED SUBSCRIPTION IDENTIFIER STORED IN A SECURITY ELEMENT, CORRESPONDING SECURITY ELEMENT, PHYSICAL OR VIRTUAL ELEMENT AND TERMINAL COOPERATING WITH THIS SECURITY ELEMENT

The domain of the invention is that of telecommunications and especially 5G devices (including IoT) and the identification of such devices communicating with security elements, embedded or not in these devices.

Security elements are typically UICCs (Universal Integrated Circuit Cards), like Sim cards for example. When these UICCs are embedded in terminals, they are called eUICCs (embedded UICCs) or iUICCs (integrated UICCs).

The terminals are typically mobile phones, smartphones or tablets and IoT devices (for 2G, 3G, 4G and 5G telecommunication networks).

When a mobile terminal tries to attach to a network for the first time (for example after a power on of the terminal), it transmits a unique identifier of the subscriber stored in the security element, known as an IMSI (International Mobile Subscriber Identifier) to the telecommunication network. The IMSI is transmitted in a NAS message in clear. It is known that the transmission in clear (without ciphering of the IMSI) constitutes a security problem since the IMSI can be intercepted by a so called IMSI-catcher. An IMSI-catcher is a telephone eavesdropping device used for intercepting mobile phone traffic and tracking location data of mobile phone users. Essentially a "fake" mobile tower acting between the target mobile phone and the service provider's real towers (BTS—Base transceiver station), it is considered a man-in-the-middle attack. For example, the IMSI can be subsequently used to send targeted messages to the mobile device subscriber (SMS spam). The 3G and 4G (LTE—Long Term Evolution) wireless standards mitigates some risk due to mutual authentication required from both the terminal and the network. However, sophisticated attacks may be able to downgrade 3G and LTE to 2G network services which do not require mutual authentication. The transmission in clear of the IMSI constitutes therefore a threat.

For 5G networks, it has been decided that the unique identifier of a subscription stored in the security element (that can be a UICC, a eUICC or a iUICC) must be transmitted encrypted when required by national regulation or chosen by the operator. This unique identifier can be the IMSI of the subscription stored in the security element or another identifier permitting to uniquely identify the security element or the terminal with which it cooperates. In 5G networks, as defined by 3GPP TS 33.501 version 0.3.0 (points 6.8.1 and 6.8.2), such an identifier is called a SUPI (Subscription Permanent Identifier) and an encrypted SUPI is part of privacy preserving identifier called a SUCI (Subscription Concealed Identifier). The SUPI can also be a NAI (Network Access Identifier). The SUCI is transmitted to the network with a parameter allowing an element of the network (typically a HSS—Home Subscriber Server for 3G and 4G networks or an AUSF—Authentication Server Function for 5G networks) to decrypt the SUCI for retrieving the SUPI.

To be more precise, a SUCI is equal to:
Network ID II Public key ID of the home network II encrypted MSIN Where, II represents the concatenation, the Network ID is the MCC/MNC (Mobile Country Code and Mobile Network Code—these are not encrypted) and the MSIN (Mobile Station Identification Number) is the rest of the IMSI (the IMSI being constituted by the MCC/MNC/MSIN).

The existing solution proposes to calculate the SUCI when this one has to be transmitted to the network (more precisely when the terminal cooperating with the security element is asking for a SUCI from this security element). The main problem is that such a calculation takes time (approximatively 150 ms) and this delays the transmission of the SUCI to the network. This is mostly problematic for IoT devices because most of them have to be able to transmit information to the network in a very short time frame (for example an IoT device integrated in a vehicle and detecting that the vehicle had just an accident—if the IoT device does not send an alert message in a very short time frame, it can be destroyed by the accident and the network operator or the rescues will never be aware that an accident occurred).

More generally, the calculation time is to be as short as possible for all so called mission critical devices, for example for V2X devices (vehicle-to-everything), where X can be equal to I (Infrastructure), V (Vehicle) or P (Pedestrian).

The present invention proposes a solution to this problem.

The invention proposes a method for transmitting to a physical or virtual element of a telecommunications network an encrypted subscription identifier stored in a security element, or an encrypted identifier of the security element or an encrypted identifier of a terminal cooperating with the security element, the method consisting in pre-calculating proactively at the occurrence of an event the encrypted identifier using a key and storing it in a file or memory of the security element with a parameter enabling the key to be calculated by the element of the telecommunications network in order to be able to transmit to this element of the telecommunications network the encrypted identifier and the parameter, without having to compute the encrypted identifier when the terminal is asking for it.

Preferably, the identifier is encrypted using an ECIES encryption scheme.

The security element is preferably a UICC, a eUICC, an iUICC or a hardware mediated execution environment.

Advantageously, the encrypted identifier is pre-calculated during one of the following events:
Turning on the terminal;
Period of inactivity of the security element;
Selection of a file or memory or of a directory by the terminal;
Reading the file or memory containing the encrypted identifier by the terminal;
Transmission of a previous encrypted identifier.

Preferably, the first encrypted identifier to be used is stored in the security element in a personalization factory.

Advantageously, more than one encrypted identifiers are pre-calculated and stored with corresponding parameters in the file or memory.

The invention also concerns a security element comprising a processing circuit for pre-calculating an encrypted subscription identifier stored in the security element or an encrypted identifier of the security element or an encrypted identifier of a terminal designed to cooperate with the security element, the encrypted identifier being pre-calculated proactively at the occurrence of an event using a key and stored in a file or memory of the security element with a parameter enabling the key to be calculated by a physical or virtual element of the telecommunications network in order to be able to transmit to the element of the telecommunications network the encrypted identifier and the parameter, without having to compute the encrypted identifier when the terminal is asking for it.

For this security element, the identifier is preferably encrypted using an ECIES encryption scheme.

The security element is preferably a UICC, a eUICC, an iUICC or a hardware mediated execution environment.

Advantageously, the processing circuit pre-calculates the encrypted identifier during one of the following events:
Turning on the terminal;
Period of inactivity of the security element;
Selection of a file or memory or of a directory by the terminal;
Reading the file or memory containing the encrypted identifier by the terminal;
Transmission of a previous encrypted identifier.

The processing circuit pre-calculates preferably more than one encrypted identifiers and stores them with corresponding parameters in the file or memory.

The invention also concerns a physical or virtual element of a telecommunications network comprising processing circuits for receiving from a security element an identifier encrypted by a key pre-calculated by the security element and stored in a file or memory of the security element with a parameter enabling the key to be calculated by the element of the telecommunications network.

This physical or virtual element is preferably constituted by a HSS or by an AUSF.

Finally, the invention concerns a terminal cooperating with such a security element and it is preferably constituted by a V2X terminal.

Figure 2:
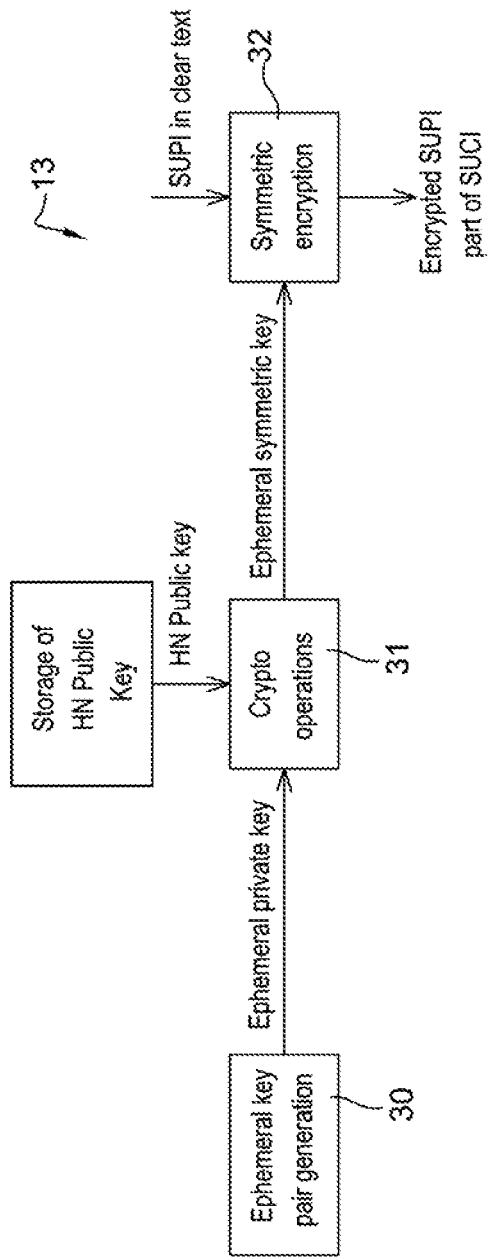
Figure 3:
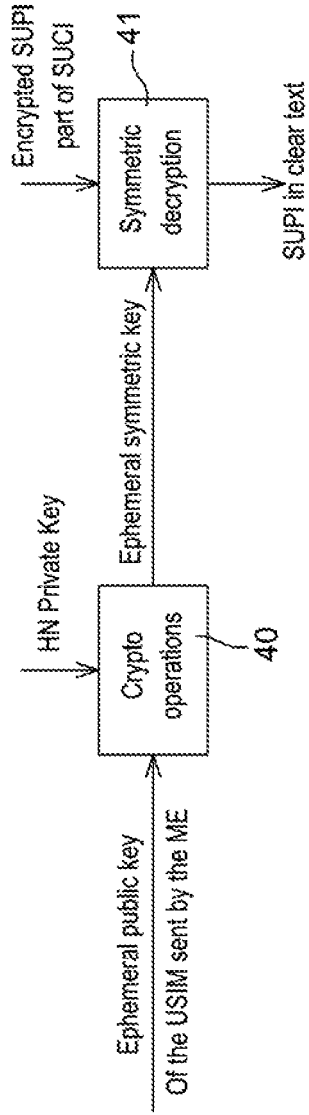

The invention will be better understood with the following description of a preferred implementation of the invention and with the accompanying figures that show:

FIG. 1 the principle of the invention;

FIG. 2 an example of encryption of the SUPI;

FIG. 3 an example of decryption of the SUPI encrypted according to FIG. 2.

FIG. 1 represents the principle of the invention.

In this figure, two devices are represented: a user equipment 10 and a network element 11, typically a HSS (Home Subscriber Server) for 3G and 4G or an AUSF (Authentication Server Function) for 5G. An AUSF is equivalent to a HSS for 5G networks. The user equipment 10 is constituted by a terminal 12 (like a mobile equipment ME) cooperating with a security element 13, here constituted by a UICC. It could also be, like foresaid, a eUICC or an iUICC. The security element 13 could also be a hardware mediated execution environment such as an ARM TrustZone or Intel SGX (a secured zone in a processor).

According to the invention, the identifier of the security element 13 (the SUPI—being for example the IMSI stored in the security element) is encrypted before being needed to be transmitted (in encrypted form: the SUCI) to the network element 11. This means that before a registration request message 15 being sent to the network element 11, the SUCI is already existing and stored in a dedicated tamper resistant zone of the security element, like for example a file or a memory of the security element 13, for example in the elementary file EF of the security element 13, with a parameter enabling the element 11 to calculate the key with which the SUPI has been encrypted (in order to be able to retrieve the SUPI). The SUCI, as shown by reference 14, is here a SUCI_1 and the parameter is Param_1. They are here concatenated as shown by the symbol II.

When the ME sends to the element 11 a registration request message (step 15), the element 11 answers (step 16) to the terminal 12 with an Identity Request message. The terminal 12 then sends (step 17) to the UICC a read command message of the file (or memory) containing the SUPI (Read EF_SUPI). Since the SUCI_1 and the parameter Param_1 are already present in this file, no computation of SUCI_1 is necessary and the security element 13 can immediately send to the terminal 12 SUCI_1 II Param_1 (step 18). The terminal 12 then sends these received data in an Identity Response message to the element 11 (step 19). At step 20, the element 11 can decrypt SUCI_1 thanks to Param_1 in order to retrieve the SUPI. The network has then identified the security element 13.

Thus, the invention proposes to pre-calculate proactively at the occurrence of an event the encrypted identifier using a key and storing it in a file or memory of the security element 13 with a parameter enabling the key to be calculated by the element 11 of the telecommunications network in order to be able to transmit to this element 11 the encrypted identifier and the corresponding parameter, without having to compute the encrypted identifier when the terminal 12 is asking for it. The computing time of 150 ms mentioned before is therefore gained because the encrypted identifier is ready for being read by the terminal. At step 21, as an example, the security element can then compute another SUCI (SUCI_2) and store SUCI_2 with Param_2 in the same file where previously SUCI_1 and Param_1 were stored. SUCI_2 and Param_2 are therefore ready to be sent at the next registration request sent from the terminal 12 to the network element 11.

The network element 11 can be physical (a HSS or a AUSF for example) or virtual.

In some embodiments, it is not the identifier SUPI associated to the security element 13 that is encrypted but an encrypted identifier of the terminal 12. The SUPI is then for example replaced by the IMEI of the terminal 12. This is particularly valid when the security element is a eUICC, an iUICC or a hardware mediated execution environment (the security element is not extractable from the terminal).

It is also possible to send an encrypted identifier of the security element, like for example an encrypted eID or ICCID. The network element 11 has then a correspondence table associating the eID or the ICCID with the IMSI (SUPI) of the security element. This is also true when an encrypted IMEI is sent to the network element 11.

As can be seen at step 21, SUCI_2 is computed after having sent SUCI_1 II Param_1 to the terminal 12. This is a triggering event. Other triggering events can cause the computing of a new SUCI (or more generally an encrypted identifier, this encrypted identifier being for example a SUCI, an encrypted identifier of the security element or an encrypted identifier of the terminal cooperating with this security element):
Turning on the terminal 12;
Period of inactivity of the security element 13;
Selection of a file or memory or of a directory by the terminal;
Reading the file or memory containing the encrypted identifier by the terminal;
Transmission of a previous encrypted identifier.

It is also possible to compute in advance a plurality of SUCIs and to store them with their respective parameters in the dedicated file or memory.

It is also possible to store in the file or memory at least the first SUCI to be used in a personalization factory. Thus, the security element is operational when leaving the personalization factory.

The SUPI is preferably encrypted by using an encryption mechanism like ECIES (Elliptic Curve Integrated Encryption Scheme). Such a mechanism is represented in FIG. 2.

In this figure, the security element 13 generates an ephemeral key pair: An ephemeral private key and an ephemeral public key (for example in a module 30). The ephemeral public key corresponds to Param_X mentioned above that will be sent along with the SUCI to the home network.

The ephemeral private key is sent to a crypto processor 31 of the security element 13. The crypto processor 31 also receives as another input the public key of the home network (HN Public Key). The crypto processor 31 generates a key called ephemeral symmetric key that is transmitted to a symmetric encryption module 32 receiving also the SUPI of the security element 13. The symmetric encryption module 32 generates the SUCI containing the encrypted SUPI.

The SUCI and the ephemeral public key are then stored in a file or memory of the security element 13.

All the operations of FIG. 2 are preferably realized in the security element 13.

If the IMEI of the terminal is used instead of the SUPI, the security element reads the IMEI of the terminal and realizes the same operations by using the IMEI instead of the SUPI.

If the eID or ICCID of the security element are encrypted, the scheme is the same, and the SUPI is not used (only the MCC/MNC codes are not encrypted in order to connect to the home network of the security element).

FIG. 3 represents an example of decryption of the SUPI encrypted according to FIG. 2.

The home network receives the SUCI and the ephemeral public key generated by the security element 13. The ephemeral public key is applied to a cryptographic module 40 receiving also the home network private key. The ephemeral symmetric key is thus recovered and applied to symmetric decryption module 41 receiving also the received SUCI. The symmetric decryption module 41 can then decrypt the SUCI for recovering the SUPI (or the IMEI or another identifier of the security element 13) and identify the security element 13.

The SUCI is changed at each attachment procedure, if it is required by the network.

The mechanism of the invention can preferably be turned on/off by setting an OS flag and/or a service in the security element 13 service table (by OTA). This allows to adapt the system to each national regulation or lets the home network operator to choose if he wishes or not to implement the invention.

The invention also concerns a security element 13 comprising a processing circuit for pre-calculating an encrypted subscription identifier stored in the security element or an encrypted identifier of the security element or an encrypted identifier of a terminal designed to cooperate with this security element, the encrypted identifier being pre-calculated proactively at the occurrence of an event using a key and stored in a file or memory of the security element with a parameter enabling the key to be calculated by a physical or virtual element of the telecommunications network in order to be able to transmit to the element of the telecommunications network the encrypted identifier and the parameter, without having to compute the encrypted identifier when the terminal is asking for it.

The security element 13 preferably encrypts the identifier by using an ECIES encryption scheme.

As said before, the security element 13 can be a UICC, a eUICC, an iUICC or a hardware mediated execution environment.

The processing circuit can for example pre-calculate the encrypted identifier during one of the following events:
Turning on the terminal 12;
Period of inactivity of the security element 13;
Selection of a file or memory or of a directory by the terminal 12;
Reading the file or memory containing the encrypted identifier by the terminal 12;
Transmission of a previous encrypted identifier.

In a preferred embodiment, the processing circuit pre-calculates more than one encrypted identifiers and stores them with corresponding parameters in the file or memory.

The invention also concerns a physical or virtual element 11 of a telecommunications network comprising processing circuits for receiving from the security element 13 an identifier encrypted by a key pre-calculated by the security element 13 and stored in a file or memory of the security element 13 with a parameter enabling the key to be calculated by the element 11 of the telecommunications network.

In a 3G or 4G network, the element of the telecommunication network identifying the security element is a HSS. In a 5G network, it is an AUSF.

Finally, the invention concerns a terminal 12 cooperating with such a security element. It is for example constituted by a V2X terminal.

One of the advantages of the invention is that the terminal 12 (for example a mobile equipment) does not need to know the permanent identity of the mobile subscriber and this mechanism means that the permanent identity of the subscriber is protected at all times. The terminal 12 will only ever have a dynamic and tokenized/surrogate value of the identifier of the security element 13 or of the terminal 12 which is usable for a given authentication.

There is no need to define a new command enabling the terminal 12 to ask encrypted value of the identifier to the tamper resistant secure hardware element 13.

Additionally, the encrypted value is immediately available to the terminal 12 due to the pre-calculation of this encrypted value following a triggering event. The processing to encrypt the identifier in the tamper resistant secure hardware element 13 does not add extra delay for the transmission of the encrypted identifier to the network element 11.

Consequently, due to the low impacts on the terminal 12, the processing of the identifier in the tamper resistant secure hardware element 13 is easily feasible.

Moreover, regarding the state of the art, by leveraging the file system, no specific command is needed to trigger processing of the confidentiality protected identifier within the UICC/eUICC/iUICC. It's already proactively prepared ahead of the reading of the value by the terminal 12.

The invention claimed is:
1. A method for transmitting to a physical or virtual element of a telecommunications network an encrypted subscription identifier stored in a security element, or an encrypted identifier of said security element or an encrypted identifier of a terminal cooperating with said security element, comprising pre-calculating proactively, at the occurrence a triggering event, said encrypted identifier using a key and storing it in a file or memory of said security element with a parameter enabling said key to be calculated by said element of said telecommunications network, in order to be able to transmit to said element of said telecommunications network said encrypted identifier and said parameter, without having to compute said encrypted identifier when said terminal is asking for it, wherein each triggering event causes a computation of a new Subscription Concealed identifier (SUCI) within said security element and stored thereon, usable for a given authentication with, and before a registration request message is sent to, said physical or virtual element of the telecommunications network, formed by the equation:

Network (identifier) ID || Public key ID of the home network || encrypted MSIN, where || represents a concatenation, said Network ID is a MCC/MNC (Mobile Country Code and Mobile Network Code that are not encrypted) and said MSIN (Mobile Station Identification Number) is a rest of an IMSI (said IMSI constituted by the MCC/MNC/MSIN).

2. The method as claimed in claim 1, wherein said identifier is encrypted using an ECIES encryption scheme.

3. The method according to claim 1, wherein said security element is a UICC, an eUICC, an iUICC or a hardware mediated execution environment.

4. The method according to claim 1, wherein said encrypted identifier is pre-calculated responsive to each of the following triggering events:
Turning on said terminal;
Period of inactivity of said security element;
Selection of a file or memory or of a directory by said terminal;
Reading said file or memory containing said encrypted identifier by said terminal; and
Transmission of a previous encrypted identifier.

5. The method according to claim 1, wherein an initial encrypted identifier to be used is stored in said security element in a personalization factory.

6. The method according to claim 1, wherein more than one encrypted identifiers are pre-calculated and stored with corresponding parameters in said file or memory.

7. A security element comprising a processing circuit for pre-calculating an encrypted subscription identifier stored in said security element or an encrypted identifier of said security element or an encrypted identifier of a terminal designed to cooperate with said security element, said encrypted identifier being pre-calculated proactively at the occurrence of a triggering event using a key and stored in a file or memory of said security element with a parameter enabling said key to be calculated by a physical or virtual element of said telecommunications network in order to be able to transmit to said element of said telecommunications network said encrypted identifier and said parameter, without having to compute said encrypted identifier when said terminal is asking for it, said encrypted identifier is pre-calculated responsive to each of the following triggering events:
Turning on said terminal;
Period of inactivity of said security element;
Selection of a file or memory or of a directory by said terminal;
Reading said file or memory containing said encrypted identifier by said terminal;
Transmission of a previous encrypted identifier, wherein each triggering event causes a computation of a new Subscription Concealed Identifier (SUCI) within said security element and stored thereon, usable for a given authentication with, and before a registration request message is sent to, said physical or virtual element of the telecommunications network, formed by the equation:

Network (Identifier) ID || Public key ID of the home network || encrypted MSIN, where || represents a concatenation, said Network ID is a MCC/MNC (Mobile Country Code and Mobile Network Code that are not encrypted) and said MSIN (Mobile Station Identification Number) is a rest of an IMSI (said IMSI) constituted by the MCC/MNC/MSIN).

8. Security element according to claim 7, wherein said identifier is encrypted using an ECIES encryption scheme.

9. The Security element according to claim 7, characterized in that it is a UICC, an eUICC, an iUICC or a hardware mediated execution environment.

10. The Security element according to claim 7, wherein said processing circuit pre-calculates said encrypted identifier during one of the following events:
Turning on said terminal;
Period of inactivity of said security element;
Selection of a file or memory or of a directory by said terminal;
Reading said file or memory containing said encrypted identifier by said terminal;
Transmission of a previous encrypted identifier.

11. The Security element according to claim 7, wherein said processing circuit pre-calculates more than one encrypted identifiers and stores them with corresponding parameters in said file or memory.

12. A physical or virtual element of a telecommunications network, comprising processing circuits for receiving from a security element an identifier encrypted by a key pre-calculated by said security element thereby producing an encrypted identifier stored in a file or memory of said security element with a parameter enabling said key to be calculated by said element of said telecommunications network, said encrypted identifier is pre-calculated responsive to each of the following triggering events:
Turning on said terminal;
Period of inactivity of said security element;
Selection of a file or memory or of a directory by said terminal;
Reading said file or memory containing said encrypted identifier by said terminal;
Transmission of a previous encrypted identifier, wherein each triggering event causes a computation of a new Subscription Concealed Identifier (SUCI) within said security element and stored thereon, usable for a given authentication with, and before a registration request message is sent to, said physical or virtual element of the telecommunications network, formed by the equation:

Network (Identifier) ID || Public key ID of the home network || encrypted MSIN, where || represents a concatenation, said Network ID is a MCC/MNC (Mobile Country Code and Mobile Network Code that are not encrypted) and said MSIN (Mobile Station Identification Number) is a rest of an IMSI (said IMSI) constituted by the MCC/MNC/MSIN).

13. The physical or virtual element of a telecommunications network according to claim 12, wherein it is constituted by an Home Subscriber Server (HSS) or by an Authentication Server Function (AUSF).

* * * * *